US011028285B2

(12) United States Patent
Tanabiki

(10) Patent No.: US 11,028,285 B2
(45) Date of Patent: Jun. 8, 2021

(54) URETHANE (METH)ACRYLATE AND ACTIVE ENERGY RAY-CURABLE RESIN COMPOSITION

(71) Applicant: DAICEL-ALLNEX LTD., Tokyo (JP)

(72) Inventor: Fumio Tanabiki, Ohtake (JP)

(73) Assignee: DAICELL-ALLNEX LTD., Tokyo (JP)

( * ) Notice: Subject to any disclaimer, the term of this patent is extended or adjusted under 35 U.S.C. 154(b) by 0 days.

(21) Appl. No.: 14/786,766

(22) PCT Filed: Jan. 23, 2014

(86) PCT No.: PCT/JP2014/051369
§ 371 (c)(1),
(2) Date: Oct. 23, 2015

(87) PCT Pub. No.: WO2014/174861
PCT Pub. Date: Oct. 30, 2014

(65) Prior Publication Data
US 2016/0068708 A1 Mar. 10, 2016

(30) Foreign Application Priority Data
Apr. 26, 2013 (JP) .............................. JP2013-094660

(51) Int. Cl.
C09D 175/14 (2006.01)
C08G 18/67 (2006.01)
C08G 18/75 (2006.01)
C08G 18/79 (2006.01)
C08G 18/80 (2006.01)
C08G 18/81 (2006.01)
C09D 175/16 (2006.01)
C08G 18/32 (2006.01)
C08F 299/06 (2006.01)

(52) U.S. Cl.
CPC ........ C09D 175/14 (2013.01); C08F 299/065 (2013.01); C08G 18/3206 (2013.01); C08G 18/3212 (2013.01); C08G 18/3218 (2013.01); C08G 18/672 (2013.01); C08G 18/673 (2013.01); C08G 18/755 (2013.01); C08G 18/792 (2013.01); C08G 18/8016 (2013.01); C08G 18/8175 (2013.01); C09D 175/16 (2013.01)

(58) Field of Classification Search
CPC . C09D 175/14; C09D 175/16; C08F 299/065; C08G 18/3206; C08G 18/3212; C08G 18/3218; C08G 18/672; C08G 18/673; C08G 18/755; C08G 18/792; C08G 18/8016; C08G 18/8175
See application file for complete search history.

(56) References Cited

U.S. PATENT DOCUMENTS

| | | | | | |
|---|---|---|---|---|---|
| 2008/0262613 | A1* | 10/2008 | Gogolewski | ........ | A61L 26/0019 623/11.11 |
| 2010/0010113 | A1* | 1/2010 | Schwalm | ........... | C08G 18/0823 522/86 |
| 2015/0005408 | A1* | 1/2015 | Lindekens | .............. | C07C 69/54 522/170 |
| 2015/0005431 | A1 | 1/2015 | Tanabiki | | |

FOREIGN PATENT DOCUMENTS

| | | | |
|---|---|---|---|
| CN | 104039850 A | | 9/2014 |
| JP | 7-26000 A | | 1/1995 |
| JP | 11-269287 A | | 10/1999 |
| JP | 2000-34334 A | | 2/2000 |
| JP | 2001-40248 A | | 2/2001 |
| JP | 2004-10698 A | | 1/2004 |
| JP | 2009-1596 A | | 1/2009 |
| JP | 2009-227915 A | | 10/2009 |
| JP | 2010-30100 A | | 2/2010 |
| JP | 2010-222568 A | | 10/2010 |
| JP | 2011-052227 | * | 3/2011 |
| JP | 2012-214048 A | | 11/2012 |
| WO | WO 2007/046292 A1 | | 4/2007 |

OTHER PUBLICATIONS

Machine English translation of JP 2011-052227, Shimizu et al., Mar. 2011.*
Machine English translation of JP 2009-001596, Hideteru et al., Jan. 2009.*
International Search Report, issued in PCT/JP2014/051369, dated Feb. 18, 2014.
Extended European Search Report dated Dec. 8, 2016, for European Application No. 14788610.5.
Chinese Office Action and Search Report dated Mar. 7, 2017 for counterpart Chinese Application No. 201480023313.7, with English translation of the Chinese Office Action.
Chinese Office Action dated Aug. 28, 2017 with English translation for Chinese Application No. 201480023313.7.

* cited by examiner

Primary Examiner — Patrick D Niland
(74) Attorney, Agent, or Firm — Birch, Stewart, Kolasch & Birch, LLP

(57) ABSTRACT

Provided is a compound capable of forming a coating layer that has excellent scratch resistance and still has stain resistance (in particular, stain resistance against hair dyes) and workability (impact resistance) both at satisfactory levels.
The urethane (meth)acrylate has a cyclic structure in a molecule. The urethane (meth)acrylate has a total weight of carbon, oxygen, nitrogen, and sulfur atoms constituting the ring or rings of the cyclic structure of 10 percent by weight or more based on the total amount (100 percent by weight) of the urethane (meth)acrylate. The urethane (meth)acrylate also has an average number of functional groups of 3.5 to 4.5.

17 Claims, No Drawings

URETHANE (METH)ACRYLATE AND ACTIVE ENERGY RAY-CURABLE RESIN COMPOSITION

TECHNICAL FIELD

The present invention relates to a urethane (meth)acrylate that is preferably usable as a component for a coating agent to form a coating layer on a surface of articles such as films, sheets, and other various molded articles and processed articles (finished products). The present invention also relates to an active-energy-ray-curable resin composition that is preferably usable as the coating agent. The present application claims priority to Japanese Patent Application No. 2013-094660 filed to Japan on Apr. 26, 2013, the entire contents of which are incorporated herein by reference.

BACKGROUND ART

Traditionally, coating layers are generally provided on surfaces typically of building materials constituting walls and floors of buildings, and other molded articles and processed articles. The coating layers are provided so as to protect the surfaces and/or to retain their beauty (beautiful appearance) over a long time. In particular, such coating layers are often provided typically on molded articles including thermoplastic resins which have relatively low resistance typically against scratches, abrasion, outdoor exposure, and chemical substances such as solvents and detergents. The coating layers should function as hard coating layers having excellent scratch resistance and should still have stain resistance against various stain-causing substances which are used daily. In particular, the coating layers should have stain resistance against hair dyes that highly cause stains. In addition, the coating layers require excellent workability (processability) such as flexibility. This is because the coating layers may be disposed directly, or typically via a film or sheet, on cabinets having a curved surface, such as bathroom interior materials and washbowls, or the coating layers being disposed on surfaces of films or sheets may be subjected to processing such as embossing.

Known coating agents to form coating layers as mentioned above are exemplified as follows. Patent Literature (PTL 1) describes a resin composition further employing a fluorine-containing surface modifier. PTL 2 describes an unsaturated polyester resin composition including an unsaturated polyester, a polymerizable monomer, and a curing agent as essential components, in which the unsaturated polyester resin contains an organopolysiloxy skeleton in its polymer backbone. The literature mentions that the unsaturated polyester resin composition offers excellent water repellency and stain resistance and still has excellent mechanical strengths. PTL 3 describes a composition for film coating, where the composition contains a carboxy-containing urethane (meth)acrylate. The carboxy-containing urethane (meth)acrylate is prepared by reacting a specific lactone polyester polyol, a polyisocyanate, and a hydroxy-containing (meth)acrylate and has an acid value of 10 mg-KOH/g or more. The literature mentions that the resulting coating has flexibility, adhesion, scratch resistance, abrasion resistance, and stain resistance at excellent levels. PTL 4 describes an active-energy-ray-curable coating composition for building-use decorative sheets. The coating composition includes an alicyclic (meth)acrylate and inorganic fine particles. The literature mentions that the coating composition forms a coating that has excellent stain resistance and has low cure shrinkage. PTL 5 describes an energy-ray-curable resin composition containing a urethane acrylate. The urethane acrylate is prepared by reacting an organic polyisocyanate, a polycarbonate polyol containing an alicyclic structure, and a (meth)acrylate containing one or more hydroxy groups per molecule. The literature mentions that the resin composition gives such a coating that even a fixed stain such as a hair dye stain can be removed therefrom only with an alcohol, where the coating still has excellent chemical resistance and flexibility. PTL 6 describes a photocurable resin composition prepared from a photopolymerizable monomer having a specific solubility parameter and a photopolymerizable oligomer. The literature mentions that the resin composition forms a coating layer that can resist the occurrence of deterioration, degradation, discoloration, and staining caused by a highly irritative detergent or a staining agent such as a hair dye.

CITATION LIST

Patent Literature

PTL 1: Japanese Unexamined Patent Application Publication (JP-A) No. H11-269287
PTL 2: JP-A No. H07-26000
PTL 3: JP-A No. 2000-34334
PTL 4: JP-A No. 2001-40248
PTL 5: JP-A No. 2009-227915
PTL 6: JP-A No. 2010-30100

SUMMARY OF INVENTION

Technical Problem

Unfortunately, however, the resin compositions described in PTL 1 to 3 and 6 form coating layers that have insufficient stain resistance against hair dyes. Specifically, once they are stained by hair dyes, the resulting stain is hardly removed therefrom. The resin compositions described in PTL 4 and 6 form coating layers that suffer from cracking upon impact application and have poor workability typically in embossing. The resin composition described in PTL 5 forms a coating layer that has insufficient scratch resistance and is not usable as a hard coating layer. As described above, the present circumstances have not yet given a hard coating agent capable of forming a coating layer that has scratch resistance, stain resistance (in particular, stain resistance against hair dyes), and workability all at excellent levels.

Accordingly the present invention has an object to provide a compound capable of forming a coating layer that has excellent scratch resistance and still offers stain resistance (in particular, stain resistance against hair dyes) and workability (impact resistance) both at satisfactory levels. The present invention has another object to provide an active-energy-ray-curable resin composition including the compound.

Solution to Problem

After intensive investigations to achieve the objects, the present inventor has found a urethane (meth)acrylate containing a cyclic structure in a specific amount in the molecule (within the molecule) and having an average number of functional groups as controlled within a specific range. The present inventor has found that this urethane (meth)acrylate, when used, contributes to the formation of a coating layer that has excellent scratch resistance and still offers stain resistance and workability (impact resistance)

both at satisfactory levels. The present invention has been made based on these findings.

Specifically, the present invention provides, in an embodiment, a urethane (meth)acrylate containing a cyclic structure in the molecule. The urethane (meth)acrylate has a total weight of carbon, oxygen, nitrogen, and sulfur atoms constituting a ring or rings of the cyclic structure of 10 percent by weight or more based on the total amount (100 percent by weight) of the urethane (meth)acrylate. The urethane (meth)acrylate has an average number of functional groups of 3.5 to 4.5.

The urethane (meth)acrylate may be prepared by reacting a polyol (X), a polyisocyanate (Y), and a hydroxy-containing (meth)acrylate (Z).

The present invention provides, in another embodiment, an active-energy-ray-curable resin composition including the urethane (meth)acrylate.

The active-energy-ray-curable resin composition may be a stain-resistant coating agent.

The present invention also provides, in yet another embodiment, a cured resin layer prepared by curing the active-energy-ray-curable resin composition.

The present invention provides, in still another embodiment, a coated article including a substrate, and the cured resin layer disposed on or over a surface of the substrate.

The cured resin layer in the coated article may be prepared by applying the active-energy-ray-curable resin composition to the substrate, and curing the applied resin composition.

In addition and advantageously the present invention provides a method for producing the coated article. The method includes the steps of applying the active-energy-ray-curable resin composition to the substrate, and curing the applied resin composition to form the cured resin layer.

Specifically the present invention relates to followings:

(1) A urethane (meth)acrylate containing a cyclic structure in the molecule. The urethane (meth)acrylate has a total weight of carbon, oxygen, nitrogen, and sulfur atoms constituting a ring or rings of the cyclic structure of 10 percent by weight or more based on the total amount (100 percent by weight) of the urethane (meth)acrylate. The unsaturated carboxylic acid amide has an average number of functional groups of 3.5 to 4.5.

(2) The cyclic structure in the urethane (meth)acrylate according to (1) may include a saturated aliphatic hydrocarbon ring or a non-aromatic heterocyclic ring.

(3) In the urethane (meth)acrylate according to one of (1) and (2), atoms constituting the ring or rings of the cyclic structure, when including oxygen atom(s), may include oxygen atom(s) constituting the cyclic structure in a proportion (percentage) of 3 percent by weight to 5.5 percent by weight.

(4) The urethane (meth)acrylate according to any one of (1) to (3) may be prepared by reacting a polyol (X), a polyisocyanate (Y), and a hydroxy-containing (meth)acrylate (Z).

(5) The urethane (meth)acrylate according to (4) may be prepared by reacting the polyol (X), the polyisocyanate (Y), and the hydroxy-containing (meth)acrylate (Z) by a method 2 as follows. In the method 2, the polyol (X) and the polyisocyanate (Y) are reacted to form an isocyanate-containing urethane isocyanate prepolymer (urethane prepolymer), and the urethane isocyanate prepolymer is reacted with the hydroxy-containing (meth)acrylate (Z).

(6) In the urethane (meth)acrylate according to (5), the urethane isocyanate prepolymer in the method 2 may be prepared by one of a method 2-1 and a method 2-3 as follows. In the method 2-1, the polyol (X) and the polyisocyanate (Y) are mixed and reacted all together. In the method 2-3, the polyol (X) is added dropwise to, and reacted with, the polyisocyanate (Y).

(7) In the urethane (meth)acrylate according to one of (5) and (6), the reaction between the urethane isocyanate prepolymer and the hydroxy-containing (meth)acrylate (Z) may be allowed to proceed in the presence of a polymerization inhibitor.

(8) In the urethane (meth)acrylate according to (7), the polymerization inhibitor may be added in an amount of 1 to 10000 ppm (by weight) relative to the formed urethane (meth)acrylate.

(9) In the urethane (meth)acrylate according to any one of (5) to (8), the reaction between the urethane isocyanate prepolymer and the hydroxy-containing (meth)acrylate (Z) may be performed in a gas atmosphere containing molecular oxygen.

(10) In the urethane (meth)acrylate according to any one of (5) to (9), the reaction between the urethane isocyanate prepolymer and the hydroxy-containing (meth)acrylate (Z) may be allowed to proceed using a catalyst.

(11) In the urethane (meth)acrylate according to (10), the catalyst may be added in an amount of 1 to 3000 ppm (by weight).

(12) The catalyst in the urethane (meth)acrylate according to one of (10) and (11) may include dibutyltin dilaurate.

(13) In the urethane (meth)acrylate according to any one of (4) to (12), the reaction(s) among the polyol (X), the polyisocyanate (Y), and the hydroxy-containing (meth)acrylate (Z) may be allowed to proceed at a temperature of 130° C. or lower.

(14) The polyol (X) in the urethane (meth)acrylate according to any one of (4) to (13) may include at least one selected from the group consisting of diols devoid of cyclic structures in the molecule; and diols containing a cyclic structure in the molecule.

(15) The polyol (X) in the urethane (meth)acrylate according to (14) may include a polyoxy-($C_2$-$C_4$ alkylene) glycol as the diol devoid of cyclic structures in the molecule.

(16) The polyol (X) in the urethane (meth)acrylate according to one of (14) and (15) may include a polyethylene glycol as the diol devoid of cyclic structures in the molecule.

(17) The polyol (X) in the urethane (meth)acrylate according to any one of (14) to (16) may include at least one selected from the group consisting of tricyclodecanedimethanol and isosorbide as the diol containing a cyclic structure in the molecule.

(18) The polyisocyanate (Y) in the urethane (meth)acrylate according to any one of (4) to (17) may include a polyisocyanate containing a cyclic structure in the molecule.

(19) The polyisocyanate (Y) in the urethane (meth)acrylate according to (18) may include at least one selected from the group consisting of alicyclic polyisocyanates and diisocyanate trimers (isocyanurates) as the polyisocyanate containing a cyclic structure in the molecule.

(20) The polyisocyanate (Y) in the urethane (meth)acrylate according to (19) may include isophorone diisocyanate as the alicyclic polyisocyanate.

(21) The polyisocyanate (Y) in the urethane (meth)acrylate according to one of (19) and (20) may include an isocyanurate compound of 1,6-hexamethylene diisocyanate as the diisocyanate trimer (isocyanurate).

(22) The hydroxy-containing (meth)acrylate (Z) in the urethane (meth)acrylate according to any one of (4) to (21) may include at least one selected from the group consisting of hydroxy-containing (meth)acrylates devoid of cyclic structures in the molecule; and hydroxy-containing (meth) acrylates containing a cyclic structure in the molecule.

(23) The hydroxy-containing (meth)acrylate (Z) in the urethane (meth)acrylate according to (22) may include at least one selected from the group consisting of 2-hydroxyethyl (meth)acrylate, 2-hydroxypropyl (meth)acrylate, 4-hydroxybutyl (meth)acrylate, pentaerythritol tri(meth)acrylate, and dipentaerythritol penta(meth)acrylates as the hydroxy-containing (meth)acrylates devoid of cyclic structures in the molecule.

(24) The hydroxy-containing (meth)acrylate (Z) in the urethane (meth)acrylate according to one of (22) and (23) may include at least one selected from the group consisting of cyclohexanedimethanol (meth)acrylate, bisphenol-A diglycidyl acrylate, and hydrogenated products of bisphenol-A diglycidyl acrylate as the hydroxy-containing (meth)acrylates containing a cyclic structure in the molecule.

(25) An active-energy-ray-curable resin composition including the urethane (meth)acrylate according to any one of (1) to (24).

(26) The active-energy-ray-curable resin composition according to (25) may contain the urethane (meth)acrylate in a content of 30 to 99 percent by weight based on the total weight (100 percent by weight) of non-volatile components in the active-energy-ray-curable resin composition.

(27) The active-energy-ray-curable resin composition according to one of (25) and (26) may include a photoinitiator.

(28) The photoinitiator in the active-energy-ray-curable resin composition according to (27) may include a photoradical polymerization initiator.

(29) The active-energy-ray-curable resin composition according to one of (27) and (28) may contain the photoinitiator in an amount of 1 to 20 parts by weight per 100 parts by weight of the total amount of radically polymerizable compound(s) contained in the active-energy-ray-curable resin composition.

(30) The active-energy-ray-curable resin composition according to any one of any one of (25) to (29) may include a reactive diluent.

(31) The reactive diluent in the active-energy-ray-curable resin composition according to (30) may include at least one selected from the group consisting of 1,6-hexanediol diacrylate, trimethylolpropane triacrylate, and tricyclodecanedimethanol diacrylate.

(32) The active-energy-ray-curable resin composition according to any one of (25) to (31) may be a stain-resistant coating agent.

(33) A cured resin layer prepared by curing the active-energy-ray-curable resin composition according to any one of (25) to (32).

(34) A coated article including a substrate and the cured resin layer according to (33) disposed on or over a surface of the substrate.

(35) The cured resin layer in the coated article according to (34) may be prepared by applying the active-energy-ray-curable resin composition to the substrate, and curing the applied resin composition.

(36) In the coated article according to (35), the active-energy-ray-curable resin composition may be applied to the substrate to a layer thickness of 5 to 25 µm.

(37) A method for producing the coated article according to any one of (34) to (36), where the method includes the steps of applying the active-energy-ray-curable resin composition to the substrate, and curing the applied resin composition to form the cured resin layer.

(38) In the method for producing the coated article according to (37), the active-energy-ray-curable resin composition may be applied to the substrate to a layer thickness of 5 to 25 µm.

Advantageous Effects of Invention

The urethane (meth)acrylate according to the present invention has the configuration. The urethane (meth)acrylate, when contained in an active-energy-ray-curable resin composition, can thereby form a coating layer that has excellent scratch resistance and still offers stain resistance (in particular, stain resistance against hair dyes) and workability (impact resistance) both at satisfactory levels.

DESCRIPTION OF EMBODIMENTS

Urethane (Meth)Acrylate (A)

The urethane (meth)acrylate according to the present invention is hereinafter also referred to as a "urethane (meth)acrylate (A)". The urethane (meth)acrylate (A) contains a cyclic structure in the molecule. The urethane (meth) acrylate (A) has a total weight of carbon, oxygen, nitrogen, and sulfur atoms constituting the ring or rings of the cyclic structure of 10 percent by weight or more based on the total amount (100 percent by weight) of the urethane (meth) acrylate (A). In addition, the urethane (meth)acrylate (A) has an average number of functional groups of 3.5 to 4.5. The total weight of the specific atoms is also referred to as a "cyclic structure percentage". As used herein the term "(meth)acrylate" refers to an acrylate and/or a methacrylate (either one or both of an acrylate and a methacrylate). The same is true for "(meth)acryloyl".

The cyclic structure possessed by the urethane (meth) acrylate (A) in the molecule is a cyclic structure including (formed by) at least one atom selected from the group consisting of carbon, oxygen, nitrogen, and sulfur atoms. More specifically, the cyclic structure is exemplified by aliphatic hydrocarbon rings, aromatic hydrocarbon rings, and heterocyclic rings. The aliphatic hydrocarbon rings are exemplified by monocyclic aliphatic hydrocarbon rings and polycyclic aliphatic hydrocarbon rings. The monocyclic aliphatic hydrocarbon rings are exemplified by cycloalkane rings such as cyclopropane ring, cyclobutane ring, cyclopentane ring, and cyclohexane ring, of which $C_3$-$C_{10}$ cycloalkane rings are typified; and cycloalkene rings such as cyclohexene ring, of which $C_3$-$C_{10}$ cycloalkene rings are typified. The polycyclic aliphatic hydrocarbon rings are exemplified by bridged rings such as norbornane ring, norbornene ring, bicyclo[3.2.1]octane ring, bicyclo[4.3.2] undecane ring, adamantane ring, tricyclodecane ring, and tetracyclododecane ring; and spiro rings. The aromatic hydrocarbon rings are exemplified by monocyclic aromatic hydrocarbon rings such as benzene ring; and polycyclic aromatic hydrocarbon rings typified by fused benzene rings such as naphthalene ring, anthracene ring, phenanthrene ring, fluorene ring, indene ring, and pyrene ring. The heterocyclic rings are exemplified by heterocyclic rings including carbon atom(s) and oxygen atom(s); heterocyclic rings including carbon atom(s) and nitrogen atom(s); and heterocyclic rings including carbon atom(s) and sulfur atom(s). More specifically, the heterocyclic rings are exemplified by non-aromatic heterocyclic rings such as oxirane ring, tetrahydrofuran ring, tetrahydropyran ring, morpholine ring, chroman ring, isochroman ring, tetrahydrothiophene ring, tetrahydrothiopyran ring, aziridine ring, pyrrolidine ring, piperidine ring, piperazine ring, indoline ring, 2,6-dioxabicyclo[3.3.0]octane ring, and 1,3,5-triazacyclohexane ring; and aromatic heterocyclic rings such as thiophene ring, pyrrole ring, furan ring, and pyridine ring. Among them, the cyclic structure is preferably selected from saturated aliphatic hydrocarbon rings such as cycloalkane rings and saturated aliphatic bridged rings; and non-aromatic heterocyclic rings. The urethane (meth)acrylate (A) may contain each of different cyclic structures alone or in combination. The urethane (meth)acrylate (A) may have a ring or rings in a number not critical, as long as being such a number that the urethane (meth)acrylate (A) has a cyclic structure percentage of 10 percent by weight or more.

The urethane (meth)acrylate (A) has a cyclic structure percentage of 10 percent by weight or more based on the total amount (100 percent by weight) of the urethane (meth)acrylate (A). The urethane (meth)acrylate (A), if having a ring content (cyclic structure percentage) less than 10 percent by weight, may cause the cured resin layer (coating layer) to have insufficient stain resistance.

As used herein the term "cyclic structure percentage" refers to the content of the cyclic structure as mentioned above in the molecule of a compound such as the urethane (meth)acrylate (A) and after-mentioned components (X), (Y), and (Z). Specifically, the "cyclic structure percentage" refers to the content (total amount) of atoms constituting the ring or rings of the cyclic structure based on the total amount (100 percent by weight) of the compound, where the "atoms constituting the ring or rings of the cyclic structure" refers to atoms that directly constitute the cyclic structure (cyclic structure-constituting atoms) and are selected from carbon atoms, oxygen atoms, nitrogen atoms, and sulfur atoms. The "atoms constituting the ring or rings" exclude atoms not directly constituting the cyclic structure. Typically, assume that the urethane (meth)acrylate (A) is cyclohexanedimethanol. In this case, six carbon atoms constituting the cyclohexane ring correspond to the "atoms constituting the ring or rings", whereas a total of ten hydrogen atoms bonded to the carbon atoms, and atoms constituting two methylol groups do not correspond to the "atoms constituting the ring or rings". Also assume that the urethane (meth)acrylate (A) is HMDI trimer (hexamethylene diisocyanate isocyanurate). In this case, three carbon atoms and three nitrogen atoms constituting the 1,3,5-triazacyclohexane ring correspond to the "atoms constituting the ring or rings"; whereas three oxygen atoms respectively bonded to the three carbon atoms, and atoms constituting three [—$CH_2$)$_6$—NCO] groups respectively bonded to the three nitrogen atoms do not correspond to the "atoms constituting the ring or rings".

When the atoms constituting the ring or rings of the cyclic structure in the urethane (meth)acrylate (A) include one or more oxygen atoms, the urethane (meth)acrylate (A) may contain the oxygen atom(s) constituting the cyclic structure (cyclic-structure-constituting oxygen atom(s)) in a percentage not critical, but preferably 3 percent by weight or more. This is preferred from the viewpoint of the impact resistance of the cured resin layer. The upper limit of the cyclic-structure-constituting oxygen atom percentage is not critical, but typically 5.5 percent by weight.

The cyclic structure percentage of the urethane (meth) acrylate (A) can be controlled typically, but not limitatively, by a cyclic structure percentage in starting materials to form the urethane (meth)acrylate (A). Typically assume that the components (X) to (Z) are used as the starting materials. In this case, the cyclic structure percentage may be controlled to 10 percent by weight or more based on the total amount (100 percent by weight) of the starting materials. This may efficiently give the urethane (meth)acrylate (A) which has a cyclic structure percentage of 10 percent by weight or more.

The urethane (meth)acrylate (A) may be a mixture of two or more different urethane (meth)acrylates having identical or different cyclic structure percentages. When the urethane (meth)acrylate (A) is a mixture of two or more urethane (meth)acrylates having different cyclic structure percentages, the cyclic structure percentage of the entire urethane (meth)acrylate (A) can be controlled by the blending proportions of the individual urethane (meth)acrylates.

The urethane (meth)acrylate (A) may have an average number of functional groups not critical, as long as being 3.5 to 4.5, but more preferably 3.7 to 4.3, and furthermore preferably 3.8 to 4.2. The urethane (meth)acrylate (A), if having an average number of functional groups of less than 3.5, may cause the cured resin layer to have insufficient scratch resistance. In contrast, the urethane (meth)acrylate (A), if having an average number of functional groups of greater than 4.5, may cause the cured resin layer to have insufficient workability (impact resistance).

The "average number of functional groups" of the urethane (meth)acrylate (A) according to the present invention refers to an average of numbers of (meth)acryloyl groups per molecule of the urethane (meth)acrylate according to the present invention (average number of (meth)acryloyl groups). Typically, assume that the urethane (meth)acrylate (A) is prepared by reacting a polyol (X), a polyisocyanate (Y), and a hydroxy-containing (meth)acrylate (Z) as described below, where the polyol (X) is a diol, the polyisocyanate (Y) is a diisocyanate, and the molar ratio among the component (X), the component (Y), and the component (Z) is 1:2:2. In this case, when the component (Z) is a monofunctional component (a component containing one hydroxy group and one (meth)acryloyl group per molecule), the average number of functional groups is 2. When the component (Z) is a trifunctional component (a component containing one hydroxy group and three (meth)acryloyl groups per molecule), the average number of functional groups is 6.

The urethane (meth)acrylate (A) may be a mixture of two or more different urethane (meth)acrylates having identical or different average numbers of functional groups. When the urethane (meth)acrylate (A) is a mixture of two or more urethane (meth)acrylates having different average numbers of functional groups, the average number of functional groups of the mixture (the entire urethane (meth)acrylate (A)) may be determined as a weighted average. Typically, assume that the urethane (meth)acrylate (A) is a mixture of 0.3 mol of a urethane (meth)acrylate having an average number of functional groups of 2, 0.2 mol of a urethane (meth)acrylate having an average number of functional groups of 3, and 0.5 mol of a urethane (meth)acrylate having an average number of functional groups of 4. In this case, the average number of functional groups of the urethane (meth)acrylate (A) can be calculated as 3.2 according to an expression as follows:

$$(2\times0.3+3\times0.2+4\times0.5)/(0.3+0.2+0.5)=3.2/1.0=3.2$$

Also assume that the urethane (meth)acrylate (A) is a mixture of 0.3 mol of a urethane (meth)acrylate having an average number of functional groups of 3, 0.2 mol of a urethane (meth)acrylate having an average number of functional groups of 4, and 0.5 mol of a urethane (meth)acrylate having an average number of functional groups of 5. In this case, the average number of functional groups of the urethane (meth)acrylate (A) can be calculated as 4.2 according to an expression as follows:

$$(\times0.3+4\times0.2+5\times0.5)/(0.3+0.2+0.5)=4.2/1.0=4.2$$

Method for Producing Urethane (Meth)Acrylate (A)

The urethane (meth)acrylate (A) may be produced typically, but not limitatively, by reacting a polyol (X), a polyisocyanate (Y), and a hydroxy-containing (meth)acrylate (Z). The polyol (X) is also referred to as a "component (X)" or simply as "X". The polyisocyanate (Y) is also referred to as a "component (Y)" or simply as "Y". The hydroxy-containing (meth)acrylate (Z) is also referred to as a "component (Z)" or simply as "Z". The urethane (meth)acrylate (A) may also be produced by mixing two or more different urethane (meth)acrylates.

A method for reacting the components (X), (Y), and (Z) is not limited, but exemplified by methods 1 to 3 as follows.

In the method 1, the components (X), (Y), and (Z) are mixed and reacted all together.

In the method 2, the component (X) and the component (Y) are reacted to form an isocyanate-containing urethane isocyanate prepolymer (urethane prepolymer), and the urethane isocyanate prepolymer and the component (Z) are reacted.

In the method 3, the component (Y) and the component (Z) are reacted to form an isocyanate-containing urethane isocyanate prepolymer (urethane prepolymer), and the prepolymer and the component (X) are reacted.

Among the methods 1 to 3, the method 2 is preferred.

In contrast, the method 1, when employed to form the urethane (meth)acrylate (A), may cause a large amount of a urethane isocyanate prepolymer including repeating units derived from the polyol (X) and the polyisocyanate (Y) to be by-produced, and this may cause the cured resin layer to suffer from deterioration in scratch resistance and abrasion resistance. In addition, the method 1 may cause a variety of complicated compounds to be formed irregularly. This may impede the quality control of the resulting product when used in an active-energy-ray-curable resin composition.

The reaction, when performed by the method 3, may cause the by-production of a compound in which all the isocyanate groups of the polyisocyanate (Y) are reacted with the hydroxy-containing (meth)acrylate (Z). The by-product is devoid of the skeleton of the polyol (X). The presence of the by-product devoid of the polyol (X) skeleton in the molecular frame may cause the cured resin layer to suffer from deterioration in stain resistance and workability.

In the method 2, the urethane isocyanate prepolymer may be synthesized by a method that is not limited, but is exemplified by methods 2-1, 2-2, and 2-3 as follows.

In the method 2-1, the component (X) and the component (Y) are mixed and reacted all together (at once).

In the method 2-2, the component (Y) is added dropwise to, and reacted with, the component (X).

In the method 2-3, the component (X) is added dropwise to, and reacted with, the component (Y).

When the method 2-2 is employed, the polyisocyanate (Y) is added dropwise to a large amount of the polyol (X). Thus, both (two) isocyanate groups of the polyisocyanate (Y) (in the case of a diisocyanate) are reacted and urethanized with 2 mol of hydroxy groups of the polyol (X) (in the case of a diol) so as to by-produce a urethane isocyanate prepolymer of X—Y—X form, as schematically illustrated, having hydroxy groups at both termini. This is further reacted with 2 mol of the polyisocyanate (Y) (in the case of a diisocyanate) to by-produce a compound of Y—X—Y—X—Y form, as schematically illustrated, having isocyanate groups at both termini. Similar reactions are repeated to by-produce large amounts of compounds having a structure schematically illustrated as follows:

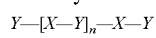

wherein n is an integer of 1 or more.

The resulting reaction product including large amounts of such by-products, when reacted with the hydroxy-containing (meth)acrylate (Z), forms a urethane (meth)acrylate including (meth)acryloyl groups in a low density, and this may cause the cured product to fail to have a sufficient cross-linking density. Accordingly, the method 2-1 or the method 2-3 is preferably employed so as to give the target urethane isocyanate prepolymer in a good yield.

Method 2-1

The method 2-1 is preferably performed in the following manner. The polyol (X), the polyisocyanate (Y), and, according to necessity, a diluting solvent (e.g., ethyl acetate or butyl acetate) are charged into a reactor, heated as needed with stirring to give a uniform mixture, and a urethanization catalyst is charged into the reactor to initiate or progress the reaction (urethanization) between the component (X) and the component (Y). After the charging of the urethanization catalyst, the resulting mixture may be heated as needed.

If the urethanization catalyst is charged from the beginning, the urethanization reaction starts and proceeds upon the charging of the polyisocyanate (Y) in a state where a mixture of the polyol (X) and the polyisocyanate (Y) still remains heterogeneous. This may cause the resulting urethane isocyanate prepolymer to have a varying molecular weight and/or a varying viscosity, and may cause the reaction to terminate in a state where unreacted polyisocyanate (Y) still remains in the system. In this case, by-products are formed as a result of the reaction between the hydroxy-containing (meth)acrylate (Z) used later and the residual polyisocyanate (Y) alone. Disadvantageously, such by-products may cause the cured resin layer to suffer from deterioration in stain resistance and workability. The target urethane (meth)acrylate (A) may contain such by-products, if any, in a content of preferably less than 15 percent by weight based on the total amount of the urethane (meth)acrylate (A). The urethane (meth)acrylate (A), if containing by-products in a content of 15 percent by weight or more, may cause the cured resin layer to suffer from deterioration in stain resistance and workability. The method 2-1 can produce the urethane (meth)acrylate (A) in one pot and is industrially advantageous.

Method 2-3

The method 2-3 may be performed in the following manner. The polyisocyanate (Y), the urethanization catalyst, and, according to necessity, a diluting solvent (e.g., ethyl acetate or butyl acetate) are charged into a reactor, following by stirring to give a uniform mixture. The mixture with stirring is heated as needed, and to which the polyol (X) is added dropwise.

The method 2-3 least causes by-production of the following by-products as described in the method 2-2 and is thereby preferred:

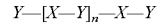

wherein n is an integer of 1 or more.

In any method, the reaction between the polyol (X) and the polyisocyanate (Y) to synthetically prepare the urethane isocyanate prepolymer is preferably performed until the isocyanate group concentration in the reaction mixture becomes equal to or less than an end-point isocyanate group concentration.

The term "end-point isocyanate group concentration" refers to a higher isocyanate group concentration between a theoretical isocyanate group concentration and an isocyanate group concentration at which the isocyanate group concentration no longer changes. The theoretical isocyanate group concentration is a theoretical isocyanate group concentration on the assumption that all hydroxy groups charged in the system be urethanized. This is hereinafter also referred to as a "theoretical end-point isocyanate group concentration".

The reaction between the urethane isocyanate prepolymer and the component (Z) is preferably allowed to proceed in the presence of a polymerization inhibitor so as to inhibit polymerization. The polymerization inhibitor is exemplified by hydroquinone, hydroquinone monomethyl ether, and phenothiazine. One or more of these polymerization inhibitors may be added (used) in an amount of preferably 1 to 10000 ppm (by weight), more preferably 100 to 1000 ppm, and furthermore preferably 400 to 500 ppm, relative to the urethane (meth)acrylate (A) to be formed. The polymerization inhibitor(s), if added in an amount less than 1 ppm relative to the urethane (meth)acrylate (A), may fail to offer sufficiently effective polymerization inhibition. In contrast, the polymerization inhibitor(s), if added in an amount greater than 10000 ppm, may adversely affect properties of the product.

For a similar purpose, this reaction is preferably performed in a gas atmosphere containing molecular oxygen. The oxygen concentration may be selected as appropriate in consideration of safety.

A catalyst may be used to allow the reaction to proceed at a sufficient reaction rate. The catalyst is exemplified by dibutyltin dilaurate, tin octoate, and tin chloride. Among them, dibutyltin dilaurate is preferred from the point of reaction rate. The catalyst may be added (used) in an amount not critical, but generally preferably 1 to 3000 ppm (by weight), and more preferably 50 to 1000 ppm. The catalyst, if added in an amount less than 1 ppm, may fail to provide a sufficient reaction rate. In contrast, the catalyst, if used in an amount greater than 3000 ppm, may adversely affect properties of the product.

The reaction to form the urethane (meth)acrylate (A) may be allowed to proceed in the presence of a known volatile organic solvent. The volatile organic solvent is exemplified by, but not limited to, ethyl acetate, butyl acetate, isobutyl acetate, acetone, methyl ethyl ketone, methyl isobutyl ketone, diisobutyl ketone, diethylene glycol monobutyl ether acetate, propylene glycol monomethyl acetate, xylenes, and toluene. Among them, ethyl acetate and butyl acetate are typically preferred from the viewpoints of boiling point and economic efficiency.

The reaction to form the urethane (meth)acrylate (A) may be performed using a reactive diluent instead of the volatile organic solvent. The reactive diluent is exemplified by, but not limited to, 1,6-hexanediol diacrylate, trimethylolpropane triacrylate, and tricyclodecanedimethanol diacrylate. The reaction, when using the reactive diluent, gives a product as a composition including the urethane (meth)acrylate (A) and the reactive diluent. The reactive diluent may be blended as needed after the formation of the urethane (meth)acrylate (A) so as typically to adjust the viscosity of the after-mentioned active-energy-ray-curable resin composition and to adjust the hardness of the cured resin layer.

The reactive diluent for use herein may also be selected from commercial products available from the market typically as 1,6-hexanediol diacrylate (e.g., product name HDDA supplied by DAICEL-CYTEC Company, Ltd.), trimethylolpropane triacrylate (e.g., product name TMPTA supplied by DAICEL-CYTEC Company, Ltd.), tricyclodecanedimethanol diacrylate (e.g., product name IRR214-K supplied by DAICEL-CYTEC Company, Ltd.).

The reaction among the components (X), (Y), and (Z) is preferably progressed at a temperature (reaction temperature) of 130° C. or lower and more preferably at a temperature of 40° C. to 130° C. The reaction, if performed at a temperature lower than 40° C., may fail to proceed at a practically sufficient reaction rate. In contrast, the reaction, if performed at a temperature higher than 130° C., may cause thermally-induced radical polymerization to proceed and to thereby cause crosslinking of a double bond moiety, thus forming a gel (gelated product).

The reaction among the components (X), (Y), and (Z) may generally be performed until the concentration of residual isocyanate group reaches 0.1 percent by weight or less. The residual isocyanate group concentration may be analyzed typically by gas chromatography or titrimetry.

Polyol (X)

The polyol (X) is a compound containing two or more hydroxy groups per molecule. However, the "polyol (X)" herein excludes compounds corresponding to the hydroxy-containing (meth)acrylate (Z). The polyol (X) to be used as a starting material to form the urethane (meth)acrylate (A) may include each of different polyols alone or in combination.

The polyol (X) usable herein may be selected without limitation from known or common compounds containing two or more hydroxy groups per molecule. Such polyols are exemplified by polyols devoid of cyclic structures in the molecule; and polyols containing a cyclic structure in the molecule. The polyols devoid of cyclic structures in the molecule are exemplified by diols such as ethylene glycol, propylene glycol, trimethylene glycol, tetramethylene glycol, 1,3-butanediol, 1,4-butanediol, 1,6-hexanediol, neopentyl glycol, diethylene glycol, triethylene glycol, dipropylene glycol, polyoxy-($C_2$-$C_4$ alkylene) glycols (e.g., polyethylene glycols, polypropylene glycols, and polyoxytetramethylene glycols), polyester diols, polyether diols, and polycarbonate diols; and polyols containing three or more hydroxy groups per molecule, such as glycerol, 1,1,1-tris(hydroxymethyl) propane, D-sorbitol, xylitol, D-mannitol, D-mannite, diglycerol, polyglycerols, trimethylolethane, trimethylolpropane, pentaerythritol, polyether polyols, polyester polyols, polycarbonate polyols, acrylic polyols, epoxy polyols, natural oil polyols, silicon-containing polyols, fluorine-containing polyols, and polyolefin polyols. The polyols containing a cyclic structure in the molecule are exemplified by diols such as bisphenol-A and alkylene oxide adducts thereof, bisphenol-F and alkylene oxide adducts thereof, hydrogenated bisphenol-A and alkylene oxide adducts thereof, hydrogenated bisphenol-F and alkylene oxide adducts thereof, cyclohexanediol, cyclohexanedimethanol, tricyclodecanedimethanol, isosorbide, xylene glycol, polyester diols, polyether diols, and polycarbonate diols; and polyols containing three or more hydroxy groups. The polyol (X) usable herein may also be selected from polyols containing a cyclic structure in the molecule, which are exemplified by polyols containing an alicyclic skeleton as described in JP-A No. 2011-094108. The polyols just mentioned above are exemplified by polyester polyols containing an alicyclic skeleton, polyolefin polyols containing an alicyclic skeleton, polyacrylic polyols containing an alicyclic skeleton, and polycarbonate polyols containing an alicyclic skeleton.

The polyol (X) for use herein may also be selected from commercial products available typically as product name TCD alcohol DM (tricyclodecanedimethanol, supplied by OXEA Corporation), product name Isosorbide (isosorbide, supplied by Toei Chemical Co., Ltd.), and product name PEG-400 (polyethylene glycol having a number-average molecular weight of 400, supplied by Sanyo Chemical Industries, Ltd.).

Polyisocyanate (Y)

The polyisocyanate (Y) is a compound containing two or more isocyanate groups per molecule. The polyisocyanate (Y) as a starting material to form the urethane (meth)acrylate (A) may include each of different polyisocyanates alone or in combination.

The polyisocyanate (Y) for use herein may be selected from, but not limited to, known or common compounds containing two or more isocyanate groups per molecule. Such compounds are exemplified by polyisocyanates devoid of cyclic structures in the molecule; and polyisocyanates containing a cyclic structure in the molecule. The polyisocyanates devoid of cyclic structures in the molecule are exemplified by diisocyanates such as 1,6-hexane diisocyanate, 2,2,4-trimethylhexamethylene diisocyanate, and 2,4,4-trimethylhexamethylene diisocyanate; and diisocyanate trimers (e.g., biuret and adducts). The polyisocyanates containing a cyclic structure in the molecule are exemplified by aromatic polyisocyanates such as xylylene diisocyanates and diphenylmethane diisocyanates; alicyclic polyisocyanates such as polyisocyanates prepared by hydrogenation of aromatic polyisocyanates, and isophorone diisocyanate; and diisocyanate trimers (isocyanurates) such as 1,6-hexamethylene diisocyanate isocyanurate and 2,6-hexamethylene diisocyanate isocyanurate.

The polyisocyanate (Y) for use herein may be selected from commercial products available typically as product name Sumidur N3300 (an isocyanurate compound derived from 1,6-hexamethylene diisocyanate, supplied by Sumitomo Bayer Urethane Co., Ltd.), and product name VESTANAT IPDI (isophorone diisocyanate, supplied by Evonik Industries AG).

Hydroxy-Containing (Meth)Acrylate (Z)

The hydroxy-containing (meth)acrylate (Z) is a compound containing at least one hydroxy group per molecule and at least one (meth)acryloyl group per molecule. The hydroxy-containing (meth)acrylate (Z) as a starting material to form the urethane (meth)acrylate (A) may include each of different hydroxy-containing (meth)acrylates alone or in combination.

The hydroxy-containing (meth)acrylate (Z) is exemplified by, but not limited to, hydroxy-containing (meth)acrylates devoid of cyclic structures in the molecule; and hydroxy-containing (meth)acrylates containing a cyclic structure in the molecule. The hydroxy-containing (meth)acrylates devoid of cyclic structures in the molecule are exemplified by 2-hydroxyethyl (meth)acrylate, 2-hydroxypropyl (meth)acrylate, 4-hydroxybutyl (meth)acrylate, pentaerythritol tri(meth)acrylate, and dipentaerythritol penta(meth)acrylates. The hydroxy-containing (meth)acrylates containing a cyclic structure in the molecule are exemplified by cyclohexanedimethanol (meth)acrylate; epoxy acrylates such as bisphenol-A diglycidyl diacrylate; and hydrogenated products of them.

The hydroxy-containing (meth)acrylate (Z) for use herein may also be selected from commercial products available typically as product name BHEA (2-hydroxyethyl acrylate, supplied by Nippon Shokubai Co., Ltd.), product name CHDMA (cyclohexanedimethanol monoacrylate, supplied by Nippon Kasei Chemical Co., Ltd.), product name PETRA (a mixture of pentaerythritol triacrylate and pentaerythritol tetraacrylate, supplied by Cytec Industries Inc.).

The polyol (X), the polyisocyanate (Y), and the hydroxy-containing (meth)acrylate (Z) as starting materials to form the urethane (meth)acrylate (A) are preferably used in such a formulation (composition) that the cyclic structure percentage is 10 percent by weight or more based on the total amount (100 percent by weight) of the components (X), (Y), and (Z). This enables efficient control of the cyclic structure percentage of the urethane (meth)acrylate (A) to 10 percent by weight or more.

The urethane (meth)acrylate (A) produced by the production method may be used as intact. For example, the produced urethane (meth)acrylate (A) as a composition further including, for example, the volatile organic solvent may be used as intact as a component of the active-energy-ray-curable resin composition. Alternatively, the urethane (meth)acrylate (A) may be used after purification. The purification of the urethane (meth)acrylate (A) may be performed using a known or common procedure including a separation process such as filtration, concentration, distillation, extraction, crystallization, recrystallization, or column chromatography, or a separation process as any combination of them.

Active-Energy-Ray-Curable Resin Composition

The active-energy-ray-curable resin composition according to the present invention is a resin composition containing the urethane (meth)acrylate (A) as an essential component. The urethane (meth)acrylate (A) in the active-energy-ray-curable resin composition according to the present invention may include each of different urethane (meth)acrylates alone or in combination.

The active-energy-ray-curable resin composition according to the present invention may contain the urethane (meth)acrylate (A) in a content (blending proportion) not critical, but preferably 30 percent by weight or more (e.g., 30 to 99 percent by weight), more preferably 50 to 98 percent by weight, and furthermore preferably 80 to 97 percent by weight based on the total weight (100 percent by weight) of non-volatile components in the active-energy-ray-curable resin composition. The active-energy-ray-curable resin composition, if containing the urethane (meth)acrylate (A) in a content less than 30 percent by weight, may cause the cured coating (cured resin layer) to have insufficient stain resistance and/or workability. The term "non-volatile components" in the active-energy-ray-curable resin composition refers to components other than volatile matter in the resin composition, where the components remain as components of the cured product as intact or as reacted. For example, the term "non-volatile components" refers to components, excluding the volatile organic solvent, of the active-energy-ray-curable resin composition according to the present invention.

Photoinitiator

The active-energy-ray-curable resin composition according to the present invention may include a photopolymerization initiator (photoinitiator). The photoinitiator for use herein may be selected from known or common photo-radical polymerization initiators without limitation. Such photo-radical polymerization initiators are exemplified by 1-hydroxycyclohexyl phenyl ketone, 2-hydroxy-2-methyl-1-phenylpropan-1-one, diethoxyacetophenone, 1-(4-isopropylphenyl)-2-hydroxy-2-methylpropan-1-one, 1-(4-dodecylphenyl)-2-hydroxy-2-methylpropan-1-one, 4-(2-hydroxyethoxy)-phenyl(2-hydroxy-2-propyl)ketone, 2-methyl-1-[4-(methylthio)phenyl]-2-morpholinopropane-1, benzoin, benzoin methyl ether, benzoin ethyl ether, benzoin isopropyl ether, benzoin n-butyl ether, benzoin phenyl ether, benzyl dimethyl ketal, benzophenone, benzoylbenzoic acids, methyl benzoylbenzoates, 4-phenylbenzophenone, hydroxybenzophenones, and acrylated benzophenones. The photoinitiator for use in the active-energy-ray-curable resin composition according to the present invention may include each of different photoinitiators alone or in combination.

The active-energy-ray-curable resin composition according to the present invention may contain the photoinitiator in a content (blending proportion) not critical, but preferably 1 to 20 parts by weight, and more preferably 1 to 5 parts by weight per 100 parts by weight of the total amount of radically polymerizable compound or compounds (e.g., the urethane (meth)acrylate (A) and the reactive diluent) contained in the active-energy-ray-curable resin composition. The active-energy-ray-curable resin composition, if containing the photoinitiator in a content less than 1 part by weight, may undergo curing failure. In contrast, the active-energy-ray-curable resin composition, if containing the photoinitiator in a content greater than 20 parts by weight, may cause the cured resin layer to have residual odor derived from the photoinitiator and/or may adversely affect properties of the cured resin layer. For example, this resin composition may cause coloration of the cured resin layer.

Reactive Diluent

The active-energy-ray-curable resin composition according to the present invention may include a reactive diluent within such a range as not adversely affect advantageous effects of the present invention. The reactive diluent is exemplified as in the description of the urethane (meth)acrylate (A). The reactive diluent for use in the active-energy-ray-curable resin composition according to the present invention may include each of different reactive diluents alone or in combination. The resin composition may contain the reactive diluent in any content (blending proportion) not critical.

Additives

The active-energy-ray-curable resin composition according to the present invention may contain one or more of various additives as needed. Such additives are exemplified by fillers, dyestuffs and pigments, leveling agents, ultraviolet absorbers, photostabilizers, antifoaming agents, dispersing agents, and thixotropy imparting agents. The active-energy-ray-curable resin composition may contain the additive(s) in a content (blending proportion) not critical, but preferably 0 to 20 percent by weight, and more preferably 0.05 to 10 percent by weight, based on the total amount (100 percent by weight) of the active-energy-ray-curable resin composition.

The active-energy-ray-curable resin composition according to the present invention may be prepared by mixing the urethane (meth)acrylate (A) with other components such as the photoinitiator and/or the volatile organic solvent added as needed. The mixing may be performed using a known or common process or device. Such device usable herein is exemplified by mixers such as dissolvers and homogenizers; kneaders, rolls, bead mills, and planetary mixers (rotation-revolution mixers). The mixing may be performed under any conditions (e.g., temperature and number of revolutions) which are not critical and settable as appropriate.

Stain-Resistant Coating Agent

The active-energy-ray-curable resin composition according to the present invention, when used, can form a coating layer that has excellent scratch resistance and still offers stain resistance (in particular, stain resistance against hair dyes) and workability (impact resistance) both at satisfactory levels. The active-energy-ray-curable resin composition according to the present invention is thereby particularly preferably usable as a coating agent (stain-resistant coating agent) to form a coating layer (stain-resistant coating layer) so as to prevent soiling/staining of a substrate. The coating layer has excellent scratch resistance and can thereby efficiently protect the substrate on which the coating layer is disposed. The coating layer also has excellent workability and can be subjected to processing (e.g., embossing) while being disposed on the substrate. Thus, the coating layer is applicable to molded articles and processed articles which may be produced by a wide variety of production methods.

Cured Resin Layer

The active-energy-ray-curable resin composition according to the present invention, when irradiated with an active energy ray and cured, can give a cured product (cured resin). The cured product has excellent scratch resistance, stain resistance (in particular, stain resistance against hair dyes), and workability (impact resistance). Accordingly, the active-energy-ray-curable resin composition according to the present invention, when cured, gives a cured resin layer (a layer formed by the cured product) that is preferably usable as a coating layer so as to protect the substrate (e.g., a molded article or processed article) and/or to prevent the substrate from staining/soiling.

Coated Article

The cured resin layer, when disposed on or over a surface of a substrate, gives a coated article including the substrate, and the cured resin layer disposed on or over the surface of the substrate. The cured resin layer is cured from the active-energy-ray-curable resin composition according to the present invention. The coated article is a composite of the substrate and the cured resin layer. The coated article, as including the cured resin layer disposed on or over the surface of the substrate, has excellent scratch resistance, has high resistance against soiling/staining (in particular, soiling/staining by hair dyes), and still offers excellent workability. The cured resin layer in the coated article may lie entirely or partially on or over the surface of the substrate.

A material constituting the substrate in the coated article is exemplified by, but not limited to, resins (plastics) such as polyesters, polyethylenes, polypropylenes, poly(ethylene terephthalate)s, cellophane, diacetyl cellulose, triacetyl cellulose, cellulose acetate butyrate, poly(vinyl chloride)s, poly (vinylidene chlorides), poly(vinyl alcohol)s, ethylene-vinyl alcohol copolymers, polystyrenes, polycarbonates, polymethylpentenes, polysulfones, poly(ether ketone)s, poly(ether sulfone)s, poly(ether imide)s, polyimides, and acrylic resins; wood; metals such as iron, stainless steels, aluminum, titanium, copper, and silver; ceramics; earthenware (pottery); stones such as natural marble and artificial marble; glass; cloth; paper; and other organic materials, inorganic materials, and organic-inorganic hybrid materials. The substrate may include each of different materials alone or in combination.

The substrate may have any shape not critical. Typically, the substrate may be in any form selected typically from films, sheets, boards, tubes, discs, cloth, molded articles, and processed articles.

The substrate surface may have undergone a known or common surface treatment. The surface treatment is exemplified by chemical surface treatments typically with silane coupling agents; and physical surface treatments such as corona treatment, flame treatment, plasma treatment, and sand blasting.

More specifically, the substrate is exemplified by various building materials (exterior materials and interior materials) such as decorative sheets, fittings, kitchen doors, doors, attic materials, floorings, wallplates, rafters, pillars, boards, plywood, and MDF. In particular, the substrate can more effectively enjoy advantageous effects of the present invention when it is selected from building materials that are highly possibly undergo soiling/staining by stain-causing substances such as hair dyes. The building materials of this type are exemplified by building materials for use in bathrooms, such as floorings, resinous floorings, and wallpapers; and building materials for use in sink cabinets, such as sink cabinets made typically of plastics, artificial marble, or decorative sheets. Specifically, the cured resin layer, when disposed on or over a substrate of this type, can efficiently protect the substrate from scratching and soiling/staining typically by hair dyes. The cured resin layer, even when disposed on or over a material before forming or processing to form the substrate, can endure the subsequent forming and processing (e.g., embossing) and thereby enables production of coated articles by any of a wide variety of production processes.

The substrate is not limited to the building materials, but is also exemplified by various components (parts) of electric appliances and electric appliances; various components of optical products; and various components typically of vehicles, ships, and aircraft.

The coated article can be produced typically, but not limitatively, by a method essentially including the steps of applying the active-energy-ray-curable resin composition according to the present invention to the substrate (substrate surface), and curing the applied resin composition to form a cured resin layer. The application (coating) may be performed by a known or common process not limited, such as airless spraying, air spraying, roll coating, bar coating, gravure coating, or die coating. Among them, roll coating is most preferred from the viewpoints typically of easiness in coating to form a thin layer and in partial coating; cost; and workability. The coating may be performed by a so-called in-line coating technique or a so-called off-line coating technique. Coating by the in-line coating technique is performed in a production process typically of a molded article or a processed article (e.g., plastic substrate). Coating by the off-line coating technique is performed on an already-produced molded article or processed article. Specifically, this coating is performed in another step than the production steps of the molded article or processed article.

The active-energy-ray-curable resin composition according to the present invention, when applied to a surface of the substrate, may be applied to a layer thickness (coated layer thickness) not critical, but preferably 5 to 25 μm, and more preferably 8 to 16 μm. The resin composition, if applied to a thickness greater than 25 μm, is applied in a large amount, and this may require a long time to dry and/or cure the applied resin composition, thus inviting higher cost. In contrast, the resin composition, if applied to a thickness less than 5 μm, may fail to allow the cured resin layer to sufficiently exhibit hardness.

Assume that an active-energy-ray-curable resin composition according to the present invention including a volatile organic solvent is used to form the coated article. In this case, the resin composition, after applied to the substrate surface, may generally be subjected to heating and drying typically with hot air. Thereafter, the applied active-energy-ray-curable resin composition is irradiated with an active energy ray such as ultraviolet ray or electron beam and can thereby be cured in a very short time. For example, ultraviolet irradiation may be performed using a light source such as high-pressure mercury lamps, ultra-high pressure mercury lamps, carbon arc lamps, xenon lamps, and metal halide lamps. The active energy ray may be applied for a time of at longest several tens of seconds, and generally several seconds, although the time may vary depending on conditions such as the type of the light source, and the distance between the light source and the surface to which the active energy ray is applied. The application (irradiation) generally employs an irradiation source having a lamp output of about 80 to about 300 W/cm. The electron beam irradiation, when performed, is preferably performed using an electron beam having energy in the range of 50 to 1000 KeV at an irradiance of 2 to 5 Mrad. The article after the active energy ray irradiation may be heated as needed so as to further accelerate the curing.

EXAMPLES

The present invention will be illustrated in further detail with reference to several examples below. It should be noted, however, that the examples are by no means intended to limit the scope of the present invention.

Syntheses of Urethane Acrylates (UAs)

Synthetic examples of urethane acrylates will be described below. A concentration indicated by "percent by weight" refers to a concentration based on the total amount of the resulting urethane-acrylate-containing material, unless otherwise specified.

Measurement of Isocyanate Group Concentration

The isocyanate group concentration was measured in the following manner. The measurement was performed in a 100-mL glass flask with stirring with a stirrer.

A blank value was measured in the following manner. Initially, 15 mL of 0.1 N dibutylamine solution in THF was added to 15 mL of THF, further combined with three drops of bromophenol blue (1 percent by weight methanol-diluted solution) to be colored blue, and subjected to titration with hydrochloric acid having a normality of 0.1 N. A tier of the hydrochloric acid at the time when discoloration was observed was defined as $V_b$ (mL).

An isocyanate group concentration of a sample was actually measured in the following manner. Initially, $W_s$ (g) of the sample was weighed, dissolved in 15 mL of THF, and combined with 15 mL of a 0.1 N dibutylamine solution in THF. After verifying that the resulting mixture became a solution, the solution was combined with three drops of bromophenol blue (1 percent by weight methanol-diluted solution) to be colored blue, and subjected to titration with hydrochloric acid having a normality of 0.1 N. A tier of the hydrochloric acid at the time when discoloration was observed was defined as $V_s$ (mL).

The isocyanate group concentration in the sample was calculate using the above-measured values according to a computational expression as follows:

$$\text{Isocyanate group concentration (percent by weight)} = (V_b - V_s) \times 1.005 \times 0.42 \div W_s$$

Commercial products used in synthetic examples and comparative synthetic examples will be described below.

Polyisocyanates

HMDI trimer: Isocyanurate compound derived from 1,6-hexamethylene diisocyanate, product name Sumidur N3300 (supplied by Sumitomo Bayer Urethane Co., Ltd.)

IPDI: Isophorone diisocyanate, product name VESTANAT IPDI (supplied by Evonik Industries AG)

Polyols

TCDDM: Tricyclodecanedimethanol, product name TCD alcohol DM (supplied by OXEA Corporation)

ISB: isosorbide, product name Isosorbide (supplied by Toei Chemical Co., Ltd.)

PEG-400: polyethylene glycol having a number-average molecular weight of 400, product name PEG-400 (supplied by Sanyo Chemical Industries, Ltd.)

Hydroxy-Containing (Meth)Acrylates

HEA: 2-hydroxyethyl acrylate, product name BHEA (supplied by Nippon Shokubai Co., Ltd.)

CHDMA: cyclohexanedimethanol monoacrylate, product name CHDMA (supplied by Nippon Kasei Chemical Co., Ltd.)

PETIA: mixture of pentaerythritol triacrylate and pentaerythritol tetraacrylate, product name PETRA (supplied by Cytec Industries Inc.)

Volatile Organic Solvents

Ethyl acetate (supplied by Daicel Corporation)

Methyl ethyl ketone (supplied by Idemitsu Kosan Co., Ltd.)

Synthetic Example 1

Preparation of UA1

Actual charged amounts and reaction conditions will be described below. A separable flask equipped with a thermometer and a stirrer was charged with 200.0 g of ethyl acetate and 428.5 g of HMDI trimer, and the internal temperature was raised to 50° C. with stirring of the mixture. Next, 0.08 g of dibutyltin dilaurate was added, and 73.8 g of TCDDM were added dropwise over one hour while maintaining the internal temperature at 50° C. After the completion of dropwise addition, the mixture was kept on stirring at 50° C. for 2 hours, and a reaction to form a urethane isocyanate prepolymer was completed. The completion of the reaction was verified by that the isocyanate group concentration in the reaction mixture became equal to or less than the theoretical end-point isocyanate group concentration, as in following synthetic examples and comparative synthetic examples.

In this example, the process proceeded to a subsequent operation after verifying that the isocyanate group concentration in the reaction mixture became equal to or less than the theoretical end-point isocyanate group concentration (8.99 percent by weight).

Next, the internal temperature was raised to 70° C., 0.08 g of dibutyltin dilaurate was added, and 297.7 g of CHDMA were added dropwise over 3 hours while maintaining the reaction temperature at 70° C. After the completion of dropwise addition, the mixture was kept on stirring 70° C. for 3 hours. After verifying that the isocyanate group concentration became equal to or less than 0.1 percent by weight, a reaction was completed and yielded a material containing a urethane acrylate having a cyclic structure percentage of 26.5 percent by weight and an average number of functional groups of 4. This material is referred to as "UA1".

Synthetic Example 2

Preparation of UA2

A separable flask equipped with a thermometer and a stirrer was charged with 200.0 g of ethyl acetate and 506.5 g of HMDI trimer, and the internal temperature was raised to 50° C. with stirring of the mixture. Next, 0.08 g of dibutyltin dilaurate was added, and 87.2 g of TCDDM were added dropwise over one hour while maintaining the internal temperature at 50° C. After the completion of dropwise addition, the mixture was kept on stirring at 50° C. for 2 hours, and a reaction to form a urethane isocyanate prepolymer was completed.

In this example, the process proceeded to a subsequent operation after verifying that the isocyanate group concentration in the reaction mixture was equal to or less than the theoretical end-point isocyanate group concentration (9.40 percent by weight).

Next, the internal temperature was raised to 70° C., 0.08 g of dibutyltin dilaurate was added, and 206.3 g of HEA were added dropwise over 3 hours while maintaining the reaction temperature at 70° C. After the completion of dropwise addition, the mixture was kept on stirring at 70° C. for 3 hours. After verifying that the isocyanate group concentration became equal to or less than 0.1 percent by weigh, a reaction was completed and yielded a material containing a urethane acrylate having a cyclic structure percentage of 15.3 percent by weight and an average number of functional groups of 4. This material is referred to as "UA2".

Synthetic Example 3

Preparation of UA3

A separable flask equipped with a thermometer and a stirrer was charged with 200.0 g of ethyl acetate and 285.9 g of IPDI, and the internal temperature was raised to 50° C. with stirring of the mixture. Next, 0.08 g of dibutyltin dilaurate was added, and 126.2 g of TCDDM were added dropwise over one hour while maintaining the internal temperature at 50° C. After the completion of dropwise addition, the mixture was kept on stirring at 50° C. for 2 hours, and a reaction to form a urethane isocyanate prepolymer was completed.

In this example, the process proceeded to a subsequent operation after verifying that the isocyanate group concentration in the reaction mixture was equal to or less than the theoretical end-point isocyanate group concentration (8.82 percent by weight).

Next, the internal temperature was raised to 70° C., 0.08 g of dibutyltin dilaurate was added, and 74.7 g of HEA were added dropwise over one hour while maintaining the reaction temperature at 70° C. After the completion of dropwise addition, the mixture was kept on stirring at 70° C. for one hour. Successively, 313.2 g of PETIA were added dropwise over 3 hours while maintaining the internal temperature at 70° C. After the completion of dropwise addition, the mixture was kept on stirring at 70° C. for 3 hours. After verifying that the isocyanate group concentration became equal to or less than 0.1 percent by weight, a reaction was completed and yielded a material containing a urethane acrylate having a cyclic structure percentage of 21.2 percent by weight and an average number of functional groups of 4. This material is referred to as "UA3".

Synthetic Example 4

Preparation of UA4

A separable flask equipped with a thermometer and a stirrer was charged with 200.0 g of methyl ethyl ketone and 297.7 g of IPDI, and the internal temperature was raised to 50° C. with stirring of the mixture. Next, 0.08 g of dibutyltin dilaurate was added, and 98.0 g of ISB were added dropwise over one hour while maintaining the internal temperature at 50° C. After the completion of dropwise addition, the mixture was kept on stirring at 50° C. for 2 hours, and a reaction to form a urethane isocyanate prepolymer was completed.

In this example, the process proceeded to a subsequent operation after verifying that the isocyanate group concentration in the reaction mixture was equal to or less than the theoretical end-point isocyanate group concentration (9.46 percent by weight).

Next, the internal temperature was raised to 70° C., 0.08 g of dibutyltin dilaurate was added, and 77.8 g of HEA were added dropwise over one hour while maintaining the reaction temperature at 70° C. After the completion of dropwise addition, the mixture was kept on stirring at 70° C. for one hour. Successively, 326.5 g of PETIA were added dropwise over 3 hours while maintaining the internal temperature at 70° C. After the completion of dropwise addition, the mixture was kept on stirring at 70° C. for 3 hours. After verifying that the isocyanate group concentration became equal to or less than 0.1 percent by weight, a reaction was completed and yielded a material containing a urethane acrylate having a cyclic structure percentage of 20.8 percent by weight and an average number of functional groups of 4. This material is referred to as "UA4". UA4 contains 1 mol of ISB on average per molecule.

Synthetic Example 5

Preparation of UA5

A separable flask equipped with a thermometer and a stirrer was charged with 200.0 g of methyl ethyl ketone and 341.3 g of IPDI, and the internal temperature was raised to 50° C. with stirring of the mixture. Next, 0.08 g of dibutyltin dilaurate was added, and 149.7 g of ISB were added dropwise over one hour while maintaining the internal temperature at 50° C. After the completion of dropwise addition, the mixture was kept on stirring at 50° C. for 2 hours, and a reaction to form a urethane isocyanate prepolymer was completed.

In this example, the process proceeded to a subsequent operation after verifying that the isocyanate group concentration in the reaction mixture was equal to or less than the theoretical end-point isocyanate group concentration (6.23 percent by weight).

Next, the internal temperature was raised to 70° C., 0.08 g of dibutyltin dilaurate was added, and 59.4 g of HEA were added dropwise over one hour while maintaining the reaction temperature at 70° C. After the completion of dropwise addition, the mixture was kept on stirring at 70° C. for one hour. Successively, 249.6 g of PETIA were added dropwise over 3 hours while maintaining the internal temperature at 70° C. After the completion of dropwise addition, the mixture was kept on stirring at 70° C. for 3 hours. After verifying that the isocyanate group concentration became equal to or less than 0.1 percent by weight, a reaction was completed and yielded a material containing a urethane acrylate having a cyclic structure percentage of 27.2 percent by weight and an average number of functional groups of 4. This material is referred to as "UA5". UA5 contains 2 mol of ISB on average per molecule.

Synthetic Example 6

Preparation of UA6

A separable flask equipped with a thermometer and a stirrer was charged with 200.0 g of methyl ethyl ketone and 368.2 g of IPDI, and the internal temperature was raised to 50° C. with stirring of the mixture. Next, 0.08 g of dibutyltin dilaurate was added, and 181.7 g of ISB were added dropwise over one hour while maintaining the internal temperature at 50° C. After the completion of dropwise addition, the mixture was kept on stirring at 50° C. for 2 hours, and a reaction to form a urethane isocyanate prepolymer was completed.

In this example, the process proceeded to a subsequent operation after verifying that the isocyanate group concentration in the reaction mixture was equal to or less than the theoretical end-point isocyanate group concentration (4.64 percent by weight).

Next, the internal temperature was raised to 70° C., 0.08 g of dibutyltin dilaurate was added, and 48.1 g of HEA were added dropwise over one hour while maintaining the reaction temperature at 70° C. After the completion of dropwise addition, the mixture was kept on stirring at 70° C. for one hour. Successively, 202.0 g of PETIA were added dropwise over 3 hours while maintaining the internal temperature at 70° C. After the completion of dropwise addition, the mixture was kept on stirring at 70° C. for 3 hours. After verifying that the isocyanate group concentration became equal to or less than 0.1 percent by weight, a reaction was completed and yielded a material containing a urethane acrylate having a cyclic structure percentage of 31.1 percent by weight and an average number of functional groups of 4. This material is referred to as "UA6". UA6 contains 3 mol of ISB on average per molecule.

Comparative Synthetic Example 1

Preparation of UA7

A separable flask equipped with a thermometer and a stirrer was charged with 200.0 g of ethyl acetate and 407.4 g of IPDI, and the internal temperature was raised to 50° C. with stirring of the mixture. Next, 0.08 g of dibutyltin dilaurate was added, and 179.8 g of TCDDM were added dropwise over 3 hours while maintaining the internal temperature at 50° C. After the completion of dropwise addition, the mixture was kept on stirring at 50° C. for 2 hours, and a reaction to form a urethane isocyanate prepolymer was completed.

In this example, the process proceeded to a subsequent operation after verifying that the isocyanate group concentration in the reaction mixture was equal to or less than the theoretical end-point isocyanate group concentration (9.78 percent by weight).

Next, the internal temperature was raised to 70° C., 0.08 g of dibutyltin dilaurate was added, and 212.8 g of HEA were added dropwise over 3 hours while maintaining the reaction temperature at 70° C. After the completion of dropwise addition, the mixture was kept on stirring at 70° C. for one hour. After verifying that the isocyanate group concentration became equal to or less than 0.1 percent by weight, a reaction was completed and yielded a material containing a urethane acrylate having a cyclic structure percentage of 30.3 percent by weight and an average number of functional groups of 2. This material is referred to as "UA7".

Comparative Synthetic Example 2

Preparation of UA8

A separable flask equipped with a thermometer and a stirrer was charged with 200.0 g of ethyl acetate and 496.6 g of HMDI trimer, and the internal temperature was raised to 70° C. with stirring of the mixture. Next, 0.08 g of dibutyltin dilaurate was added, and 303.4 g of HEA were added dropwise over 3 hours while maintaining the internal temperature at 70° C. After the completion of dropwise addition, the mixture was kept on stirring at 70° C. for 3 hours. After verifying that the isocyanate group concentration became equal to or less than 0.1 percent by weight, a reaction was completed and yielded a material containing a urethane acrylate having a cyclic structure percentage of 8.5 percent by weight and an average number of functional groups of 3. This material is referred to as "UA8".

Comparative Synthetic Example 3

Preparation of UA9

A separable flask equipped with a thermometer and a stirrer was charged with 200.0 g of ethyl acetate and 466.2 g of HMDI trimer, and the internal temperature was raised to 50° C. with stirring of the mixture. Next, 0.08 g of dibutyltin dilaurate was added, and 154.3 g of PEG-400 were added dropwise over 2 hours while maintaining the internal temperature at 50° C. After the completion of dropwise addition, the mixture was kept on stirring at 50° C. for 2 hours, and a reaction to form a urethane isocyanate prepolymer was completed.

In this example, the process proceeded to a subsequent operation after verifying that the isocyanate group concentration in the reaction mixture was equal to or less than the theoretical end-point isocyanate group concentration (7.91 percent by weight).

Next, the internal temperature was raised to 70° C., 0.08 g of dibutyltin dilaurate was added, and 179.5 g of HEA were added dropwise over 3 hours while maintaining the reaction temperature at 70° C. After the completion of dropwise addition, the mixture was kept on stirring at 70° C. for one hour. After verifying that the isocyanate group concentration became equal to or less than 0.1 percent by weight, a reaction was completed and yielded a material containing a urethane acrylate having a cyclic structure percentage of 7.8 percent by weight and an average number of functional groups of 4. This material is referred to as "UA9".

Comparative Synthetic Example 4

Preparation of UA10

A separable flask equipped with a thermometer and a stirrer was charged with 200.0 g of ethyl acetate and 220.3 g of IPDI, and the internal temperature was raised to 50° C. with stirring of the mixture. Next, 0.08 g of dibutyltin dilaurate was added, and 97.3 g of TCDDM were added dropwise over one hour while maintaining the internal temperature at 50° C. After the completion of dropwise addition, the mixture was kept on stirring at 50° C. for 2 hours, and a reaction to form a urethane isocyanate prepolymer was completed.

In this example, the process proceeded to a subsequent operation after verifying that the isocyanate group concentration in the reaction mixture was equal to or less than the theoretical end-point isocyanate group concentration (8.04 percent by weight).

Next, the internal temperature was raised to 70° C., 0.08 g of dibutyltin dilaurate was added, and 482.5 g of PETIA were added dropwise over 3 hours while maintaining the reaction temperature at 70° C. After the completion of dropwise addition, the mixture was kept on stirring at 70° C. for 3 hours. After verifying that the isocyanate group concentration became equal to or less than 0.1 percent by weight, a reaction was completed and yielded a material containing a urethane acrylate having a cyclic structure percentage of 16.4 percent by weight and an average number of functional groups of 6. This material is referred to as "UA10".

Table 1 describes results of the synthetic examples and comparative synthetic examples. For materials and components in Table 1, amounts and percentages are by weight. Abbreviations in Table 1 are as with the abbreviations indicated in the description of the agents (components).

The percentages of cyclic structure-constituting atoms in UAs in Table 1 were calculated based on the molecular weights of HMDI trimer, PEG-400, and PETIA as determined in the following manner. The isocyanate group concentration was measured for HMDI trimer, whereas hydroxy group concentrations were measured for PEG-400 and PETIA. Based on the measured concentrations, the average molecular weights of these materials were calculated and used in the calculation of the percentages of cyclic structure-constituting atoms. Specifically, for HMDI trimer, the employed average molecular weight (570.1) was calculated on the assumption that all molecules contain three isocyanate groups per molecule. For PEG-400, the employed average molecular weight (399.3) was calculated on the assumption that all molecules contain two hydroxy groups per molecule. For PETIA, the employed average molecular weight (487) was calculated on the assumption that all molecules contain one hydroxy group per molecule.

TABLE 1

| | Synthetic Example 1 UA1 | Synthetic Example 2 UA2 | Synthetic Example 3 UA3 | Synthetic Example 4 UA4 | Synthetic Example 5 UA5 | Synthetic Example 6 UA6 | Comparative Synthetic Example 1 UA7 | Comparative Synthetic Example 2 UA8 | Comparative Synthetic Example 3 UA9 | Comparative Synthetic Example 4 UA10 |
|---|---|---|---|---|---|---|---|---|---|---|
| Average number of functional groups of UA | 4 | 4 | 4 | 4 | 4 | 4 | 2 | 3 | 4 | 6 |
| HMDI trimer | 428.5 | 506.5 | — | — | — | — | — | 496.6 | 466.2 | — |
| IPDI | — | — | 285.9 | 297.7 | 341.3 | 368.2 | 407.4 | — | — | 220.3 |
| TCDDM | 73.8 | 87.2 | 126.2 | — | — | — | 179.8 | — | — | 97.3 |
| ISB | — | — | — | 98.0 | 149.7 | 181.7 | — | — | — | — |
| PEG-400 | — | — | — | — | — | — | — | — | 154.3 | — |
| HEA | — | 206.3 | 74.7 | 77.8 | 59.4 | 48.1 | 212.8 | 303.4 | 179.5 | — |
| CHDMA | 297.7 | — | — | — | — | — | — | — | — | — |
| PETIA | — | — | 313.2 | 326.5 | 249.6 | 202.0 | — | — | — | 482.5 |

TABLE 1-continued

| | Synthetic Example 1 UA1 | Synthetic Example 2 UA2 | Synthetic Example 3 UA3 | Synthetic Example 4 UA4 | Synthetic Example 5 UA5 | Synthetic Example 6 UA6 | Comparative Synthetic Example 1 UA7 | Comparative Synthetic Example 2 UA8 | Comparative Synthetic Example 3 UA9 | Comparative Synthetic Example 4 UA10 |
|---|---|---|---|---|---|---|---|---|---|---|
| Ethyl acetate | 200.0 | 200.0 | 200.0 | — | — | — | 200.0 | 200.0 | 200.0 | 200.0 |
| Methyl ethyl ketone | — | — | — | 200.0 | 200.0 | 200.0 | — | — | — | — |
| Total | 1000.0 | 1000.0 | 1000.0 | 1000.0 | 1000.0 | 1000.0 | 1000.0 | 1000.0 | 1000.0 | 1000.1 |
| Non-volatile content | 80% | 80% | 80% | 80% | 80% | 80% | 80% | 80% | 80% | 80% |
| Percentage of cyclic structure-constituting atoms (total of carbon, oxygen, nitrogen, and sulfur atoms) in UA | 26.5% | 15.3% | 21.2% | 20.8% | 27.2% | 31.1% | 30.3% | 8.5% | 7.8% | 16.4% |
| Percentage of cyclic structure-constituting oxygen atoms in UA | 0.0% | 0.0% | 0.0% | 2.7% | 4.1% | 5.0% | 0.0% | 0.0% | 0.0% | 0.0% |

Active-Energy-Ray-Curable Resin Composition Synthesis and Cured Coating Evaluation Components shown in Table 2 were sequentially placed in a stainless beaker with mixing and stirring using a homogenizer (product name T.K. ROBOMIX supplied by PRIMIX Corporation) and yielded compositions (active-energy-ray-curable resin compositions) as examples and comparative example. The photoinitiator in Table 2 was 1-hydroxycyclohexyl phenyl ketone (product name IRGACURE 184 supplied by BASF SE).

Preparation Procedure and Evaluation Methods of Test Specimens

The active-energy-ray-curable resin compositions prepared in the examples and comparative examples were used to prepare test specimens, and the test specimens were examined to evaluate the stain resistance, chemical resistance, scratch resistance, and workability (impact resistance) by methods as described below. Evaluation results are given in Table 2.

Preparation of Test Specimens

Each of the active-energy-ray-curable resin compositions was applied to a 2-mm thick polycarbonate panel (supplied by Nippon Testpanel Co., Ltd.) using a bar coater No. 12, and dried in an oven at 80° C. for 5 minutes. The resulting workpiece was irradiated with an ultraviolet ray at an integrated light quantity of 400 mJ/cm$^2$ using a 160-W/cm high-pressure mercury lamp so as to cure the resin composition, and thereby yielded a series of test specimens including a coating layer (cured resin layer) having a layer thickness of 12 to 14 μm. The layer thicknesses of the coating layers in the test specimens are given in Table 2.

Stain Resistance

Stain-causing substances were prepared as shoe polish (shoe dye), mustard, an oil-based black ink, an oil-based red ink, and a hair dye (Bigen Cream Tone G7 supplied by Hoyu Co., Ltd.). Each of the stain-causing substances was applied to the coating layer surface in the above-prepared test specimens, left stand at room temperature for 24 hours, and wiped off with gauze impregnated with ethanol. The test specimens were then examined to measure a total luminous transmittance thereof. The stain resistance against each stain-causing substance was evaluated based on the measured total luminous transmittance according to criteria as follows. Results are recorded in "stain resistance" in Table 2.

A (very good stain resistance): 95% or more
B (good stain resistance): from 90% to less than 95%
C (poor stain resistance): from 80% to less than 90%
D (very poor stain resistance): less than 80%

Chemical Resistance

Kitchen Haiter was applied to the coating layer surface in each of the above-prepared test specimens, left stand at room temperature for 10 hours, and wiped off with dried gauze. The test specimens were examined to measure the total luminous transmittance thereof. The chemical resistance was evaluated based on the measured total luminous transmittance according to criteria as follows. Results are recorded in "chemical resistance" in Table 2.

A (very good chemical resistance): 95% or more
B (good chemical resistance): from 90% to less than 95%
C (poor chemical resistance): from 80% to less than 90%
D (very poor chemical resistance): less than 80%

Scratch Resistance

The coating layer surface in each of the above-prepared test specimens was examined using a gloss meter to measure a 60 degree gloss, and this was defined as a "60 degree gloss before testing". The coating layer surface was then rubbed as ten reciprocating movements with #0000 steel wool under a load of 500 g/cm$^2$. After the testing, the 60 degree gloss of a rubbed portion was measured in the same manner as before testing, and this was defined as a "60 degree gloss after testing". Based on these, a gloss retention was calculated according to an equation as follows. The scratch resistance was evaluated based on the determined gloss retention according to criteria as follows. Results are recorded in "scratch resistance" in Table 2.

Equation: Gloss retention(%)=(Gloss after testing)÷(Gloss before testing)×100

A (very good scratch resistance): 95% or more
B (good scratch resistance): from 90% to less than 95%
C (poor scratch resistance): from 80% to less than 90%
D (very poor scratch resistance): less than 80%

Workability (Impact Resistance)

A ¼-inch impact head with a load of 500 g was dropped from different heights on the coating layer surface in each of the above-prepared test specimens using DuPont Impact Tester, and the highest height at which the coating (coating layer) did not break was determined. Based on the determined highest height, the impact resistance was evaluated according to criteria as follows. Results are recorded in "workability (impact resistance)" in Table 2. Good impact resistance as evaluated by the testing indicates good workability in processing typified by embossing, where the processing is performed at a high speed with deformation.

A (very good impact resistance): 40 cm or more
B (good impact resistance): from 30 cm to less than 40 cm
C (poor impact resistance): from 20 cm to less than 30 cm
D (very poor impact resistance): less than 20 cm acrylates according to the present invention can form hard coating layers that have excellent scratch resistance and still offer stain resistance (in particular, stain resistance against hair dyes) and workability (impact resistance) both at satisfactory levels. The urethane (meth)acrylates and the active-energy-ray-curable resin compositions are therefore

TABLE 2

| | Example 1 | Example 2 | Example 3 | Example 4 | Example 5 | Example 6 | Comparative Example 1 | Comparative Example 2 | Comparative Example 3 | Comparative Example 4 |
|---|---|---|---|---|---|---|---|---|---|---|
| UA1 | 710 | — | — | — | — | — | — | — | — | — |
| UA2 | — | 710 | — | — | — | — | — | — | — | — |
| UA3 | — | — | 710 | — | — | — | — | — | — | — |
| UA4 | — | — | — | 710 | — | — | — | — | — | — |
| UA5 | — | — | — | — | 710 | — | — | — | — | — |
| UA6 | — | — | — | — | — | 710 | — | — | — | — |
| UA7 | — | — | — | — | — | — | 710 | — | — | — |
| UA8 | — | — | — | — | — | — | — | 710 | — | — |
| UA9 | — | — | — | — | — | — | — | — | 710 | — |
| UA10 | — | — | — | — | — | — | — | — | — | 710 |
| Photoinitiator | 17 | 17 | 17 | 17 | 17 | 17 | 17 | 17 | 17 | 17 |
| Butyl acetate | 273 | 273 | 273 | 273 | 273 | 273 | 273 | 273 | 273 | 273 |
| Total | 1000.0 | 1000.0 | 1000.0 | 1000.0 | 1000.0 | 1000.0 | 1000.0 | 1000.0 | 1000.0 | 1000.0 |
| Non-volatile content | 60% | 60% | 60% | 60% | 60% | 60% | 60% | 60% | 60% | 60% |
| Coating layer thickness (μm) | 14 | 14 | 13 | 13 | 13 | 13 | 12 | 13 | 14 | 12 |
| Stain resistance — Shoe dye | A | A | A | A | A | A | C | B | D | A |
| Stain resistance — Mustard | A | A | A | A | A | A | B | B | C | A |
| Stain resistance — Oil-based black ink | A | A | A | A | A | A | B | A | D | A |
| Stain resistance — Oil-based red ink | A | A | A | A | A | A | B | A | C | A |
| Stain resistance — Hair dye | A | B | A | A | A | A | C | C | D | A |
| Chemical resistance | A | A | A | A | A | A | D | C | D | A |
| Scratch resistance | B | B | A | A | A | B | D | D | D | A |
| Workability (impact resistance) | A | A | B | B | A | A | A | A | A | D |

Test Results

Table 2 describes as follows. The active-energy-ray-curable resin compositions according to Examples 1 to 6 included urethane (meth)acrylates each having a cyclic structure percentage of 10 percent by weight or more and an average number of functional groups of 3.5 to 4.5. These resin compositions formed coating layers (coatings) that had excellent scratch resistance, offered excellent stain resistance (in particular, stain resistance against hair dyes) and chemical resistance, and still had high workability (impact resistance). In contrast, the active-energy-ray-curable resin compositions according to Comparative Examples 1 to 4 included a urethane (meth)acrylate having an average number of functional groups of less than 3.5 or greater than 4.5, or a urethane (meth)acrylate having a cyclic structure percentage of less than 10 percent by weight. These resin compositions formed coating layers that were defective in at least one property selected from scratch resistance, stain resistance, chemical resistance, and workability (impact resistance).

The data also demonstrated that, samples containing at least one oxygen atom as a cyclic structure-constituting atom in UAs, when having a percentage of cyclic-structure-constituting oxygen atom in the UAs of 3 percent by weight or more, gave coating layers that had still better impact resistance.

INDUSTRIAL APPLICABILITY

The urethane (meth)acrylates and the active-energy-ray-curable resin compositions including the urethane (meth)

particularly useful typically as coating agents to impart scratch resistance and/or stain resistance to the surface typically of films, sheets, and other various molded articles and processed articles.

The invention claimed is:

1. A urethane (meth)acrylate comprising a cyclic structure in a molecule,
   wherein the urethane (meth)acrylate is obtained by reacting a polyol (X), a polyisocyanate (Y), and a hydroxy-containing (meth)acrylate (Z),
   wherein the polyol (X) comprises an isosorbide,
   the urethane (meth)acrylate is prepared by reacting the polyol (X) and the polyisocyanate (Y) to form an isocyanate-containing urethane isocyanate prepolymer, and reacting the urethane isocyanate prepolymer with the hydroxy-containing (meth)acrylate (Z),
   the urethane (meth)acrylate has a total weight of carbon, oxygen, nitrogen, and sulfur atoms constituting a ring or rings of the cyclic structure of 10 to 27.2 percent by weight based on the total weight (100 percent by weight) of the urethane (meth)acrylate,
   the urethane (meth)acrylate comprises two or more different hydroxy-containing (meth)acrylates,
   the urethane (meth)acrylate has an average number of functional groups of 3.5 to 4.5, and
   the urethane (meth)acrylate comprising at least one feature selected from the group consisting of (A) and (B):
   (A) the cyclic structure includes at least one heterocyclic ring, and (B) the hydroxy-containing (meth)acrylate (Z) includes hydroxy-containing (meth)acrylates containing a cyclic structure in the molecule.

2. A urethane (meth)acrylate comprising a cyclic structure in a molecule,
wherein the urethane (meth)acrylate is obtained by reacting a polyol (X), a polyisocyanate (Y), and a hydroxy-containing (meth)acrylate (Z),
the urethane (meth)acrylate is prepared by reacting the polyol (X) and the polyisocyanate (Y) to form an isocyanate-containing urethane isocyanate prepolymer, and reacting the urethane isocyanate prepolymer with the hydroxy-containing (meth)acrylate (Z),
the urethane (meth)acrylate has a total weight of carbon, oxygen, nitrogen, and sulfur atoms constituting a ring or rings of the cyclic structure of 10 to 27.2 percent by weight based on the total weight (100 percent by weight) of the urethane (meth)acrylate,
the urethane (meth)acrylate comprises two or more different hydroxy-containing (meth)acrylates,
the urethane (meth)acrylate has an average number of functional groups of 3.5 to 4.5,
the hydroxy-containing (meth)acrylate (Z) comprises 2-hydroxyethyl acrylate and pentaerythritol triacrylate, and
the cyclic structure includes at least one polycyclic aliphatic hydrocarbon ring.

3. An active-energy-ray-curable resin composition comprising
the urethane (meth)acrylate according to claim 1.

4. An active-energy-ray-curable resin composition comprising
the urethane (meth)acrylate according to claim 2.

5. The active-energy-ray-curable resin composition according to claim 3, as a stain-resistant coating agent.

6. The active-energy-ray-curable resin composition according to claim 4, as a stain-resistant coating agent.

7. A cured resin layer formed by curing the active-energy-ray-curable resin composition according to claim 3.

8. A cured resin layer formed by curing the active-energy-ray-curable resin composition according to claim 4.

9. A coated article comprising:
a substrate; and
the cured resin layer according to claim 7 disposed on or over a surface of the substrate.

10. A coated article comprising:
a substrate; and
the cured resin layer according to claim 8 disposed on or over a surface of the substrate.

11. The coated article according to claim 9,
wherein the cured resin layer is prepared by applying the active-energy-ray-curable resin composition to the substrate and curing the applied resin composition.

12. The coated article according to claim 10,
wherein the cured resin layer is prepared by applying the active-energy-ray-curable resin composition to the substrate and curing the applied resin composition.

13. A method for producing the coated article according to claim 9, the method comprising:
applying the active-energy-ray-curable resin composition to the substrate; and
curing the applied resin composition to form the cured resin layer.

14. A method for producing the coated article according to claim 10, the method comprising:
applying the active-energy-ray-curable resin composition to the substrate; and
curing the applied resin composition to form the cured resin layer.

15. The urethane (meth)acrylate according to claim 2,
wherein the polyisocyanate (Y) comprises an isophorone diisocyanate.

16. The urethane (meth)acrylate according to claim 2,
wherein the polyol (X) comprises a tricyclodecanedimethanol.

17. The urethane (meth)acrylate according to claim 16,
wherein the polyisocyanate (Y) comprises an isophorone diisocyanate.

* * * * *